United States Patent
Rang et al.

(10) Patent No.: US 12,170,566 B2
(45) Date of Patent: Dec. 17, 2024

(54) CONVERGED AVIONICS DATA NETWORK

(71) Applicant: GE Aviation Systems LLC, Grand Rapids, MI (US)

(72) Inventors: John Raymond Rang, Grand Rapids, MI (US); Abdul Jabbar, Altamont, NY (US)

(73) Assignee: GE Aviation Systems LLC, Grand Rapids, MI (US)

( * ) Notice: Subject to any disclaimer, the term of this patent is extended or adjusted under 35 U.S.C. 154(b) by 871 days.

(21) Appl. No.: 17/080,438

(22) Filed: Oct. 26, 2020

(65) Prior Publication Data

US 2022/0131598 A1 Apr. 28, 2022

(51) Int. Cl.
*H04W 56/00* (2009.01)
*B64D 43/00* (2006.01)
(Continued)

(52) U.S. Cl.
CPC ......... *H04B 7/18506* (2013.01); *B64D 43/00* (2013.01); *H04W 56/001* (2013.01);
(Continued)

(58) Field of Classification Search
CPC ............. H04W 56/001; H04W 56/004; H04W 56/0065; H04W 84/18; H04B 7/18506; B64D 43/00
(Continued)

(56) References Cited

U.S. PATENT DOCUMENTS

| 5,347,627 A | 9/1994 | Hoffmann et al. |
| 5,398,312 A | 3/1995 | Hoffmann |

(Continued)

FOREIGN PATENT DOCUMENTS

| CN | 101799365 A | 8/2010 |
| EP | 3076605 A1 | 10/2016 |

(Continued)

OTHER PUBLICATIONS

Incorporating TSN/BLS in AFDX for Mixed-Criticality Avionics Application: Specification and Analysis A. Finzi, A. Mifdaoui, F. Frances, E. Lochin, University of Toulouse—ISAE, France, Jul. 18, 2017 (pp. 1-12).*

(Continued)

*Primary Examiner* — Tauqir Hussain
(74) *Attorney, Agent, or Firm* — McGarry Bair PC (57) ABSTRACT

An apparatus and method for operating an avionics data network includes a network switch core configured for a time-sensitive networking (TSN) schema, a set of ARINC 664 (A664) and a set of TSN networking end nodes communicatively connected with the network switch core. The network switch core is configured to receive, from the first set of networking end nodes, a set of data frames, determine the respective schema of the set of data frames, police the set of data frames based on the determined respective schema using a set of predetermined rules, forward the set of data frames to a predetermined queue on an egress port of the network switch core based on the determined respective schema, and transmit set of data frames to an end node of the second set of networking end nodes having a corresponding schema.

18 Claims, 5 Drawing Sheets

(51) Int. Cl.
*H04B 7/185* (2006.01)
*H04W 84/18* (2009.01)

(52) U.S. Cl.
CPC ..... *H04W 56/004* (2013.01); *H04W 56/0065* (2013.01); *H04W 84/18* (2013.01)

(58) Field of Classification Search
USPC .......................................................... 709/236
See application file for complete search history.

(56) References Cited

U.S. PATENT DOCUMENTS

| | | | |
|---|---|---|---|
| 5,511,385 | A | 4/1996 | Drew et al. |
| 6,216,066 | B1 | 4/2001 | Goebel et al. |
| 7,172,467 | B1* | 2/2007 | Yohn ....................... H01R 13/64 |
| | | | 439/744 |
| 7,590,430 | B1 | 9/2009 | Urbanek |
| 7,966,345 | B1 | 6/2011 | Funston |
| 9,282,150 | B2 | 3/2016 | Wood |
| 9,321,543 | B2 | 4/2016 | Randerath et al. |
| 10,270,567 | B1* | 4/2019 | Rang ....................... H04L 5/0044 |
| 10,331,096 | B2 | 6/2019 | Pavaskar et al. |
| 11,159,444 | B2* | 10/2021 | Nishimura ............... H04L 49/90 |
| 2004/0089141 | A1 | 5/2004 | Georges et al. |
| 2004/0237051 | A1 | 11/2004 | Clauson |
| 2005/0100313 | A1 | 5/2005 | Wang |
| 2006/0015844 | A1 | 1/2006 | Johnson et al. |
| 2006/0126608 | A1 | 6/2006 | Pereira et al. |
| 2008/0059504 | A1 | 3/2008 | Barbetta et al. |
| 2009/0112368 | A1 | 4/2009 | Mann, III et al. |
| 2009/0112379 | A1 | 4/2009 | Geiter |
| 2010/0063818 | A1 | 3/2010 | Mason et al. |
| 2010/0204855 | A1 | 8/2010 | Vial |
| 2011/0031323 | A1 | 2/2011 | Nold et al. |
| 2012/0019400 | A1 | 1/2012 | Patel et al. |
| 2012/0236784 | A1* | 9/2012 | Lynch ................. H04B 7/18506 |
| | | | 370/316 |
| 2013/0179028 | A1 | 7/2013 | Gu et al. |
| 2015/0103734 | A1* | 4/2015 | Bobrek ............... H04L 47/6275 |
| | | | 370/316 |
| 2015/0103735 | A1* | 4/2015 | Bobrek .................... H04L 47/10 |
| | | | 370/316 |
| 2015/0103825 | A1* | 4/2015 | Bobrek ................... H04L 12/40 |
| | | | 370/392 |
| 2015/0106473 | A1* | 4/2015 | Bobrek ................... H04L 69/08 |
| | | | 709/217 |
| 2015/0106537 | A1* | 4/2015 | Bobrek ................. H04L 47/564 |
| | | | 710/54 |
| 2016/0308751 | A1* | 10/2016 | Rang ..................... H04L 49/351 |
| 2017/0331748 | A1* | 11/2017 | Mangin ................. H04L 47/826 |
| 2018/0084055 | A1 | 3/2018 | Mong |
| 2018/0309656 | A1* | 10/2018 | Regev .................. H04L 43/045 |
| 2019/0109728 | A1* | 4/2019 | Steiner ................ H04L 65/1101 |
| 2019/0199641 | A1 | 6/2019 | Lo Bello et al. |
| 2020/0201801 | A1 | 6/2020 | Monnier et al. |
| 2020/0412669 | A1* | 12/2020 | Schubert ................. H04L 45/44 |
| 2021/0211500 | A1* | 7/2021 | Ferguson ................ H04L 12/44 |
| 2022/0311683 | A1* | 9/2022 | Vollstedt ............... H04L 43/028 |

FOREIGN PATENT DOCUMENTS

| | | | | |
|---|---|---|---|---|
| EP | 3057273 | B1 | 3/2019 | |
| EP | 3624419 | A1 * | 3/2020 | ........... H04L 5/0044 |
| EP | 3468115 | B1 | 6/2020 | |
| EP | 3671499 | A1 | 6/2020 | |
| GB | 2450241 | A1 | 12/2008 | |
| WO | 20120140247 | A1 | 10/2012 | |
| WO | 2012163985 | A1 | 12/2012 | |
| WO | 2012163986 | A1 | 12/2012 | |

OTHER PUBLICATIONS

Incorporating TSN/BLS in AFDX for Mixed-Criticality Applications: Model and Timing Analysis A. Finzi, A. Mifdaoui, F. Frances, E. Lochin, University of Toulouse—ISAE, France, Aug. 30, 2023 (pp. 1-10).*

University of Toulouse-Isae, France, A. Finzi, A. Mifdaoui, F. Frances, E. Lochin, "Incorporating TSN/BLS in AFDX for Mixed-Criticality Avionics Applications: Specification and Analysis", Jul. 18, 2017, 12 pages, US.

* cited by examiner

CONVERGED AVIONICS DATA NETWORK

TECHNICAL FIELD

This disclosure relates generally to data communication networks, and more specifically to systems and methods for transmitting data flows in converged data communications networks having a time-sensitive network schema.

BACKGROUND

For contemporary aircraft, an avionics 'platform' consists of a variety of elements such as sensors, data concentrators, a data communications network, radio frequency sensors and communication equipment, computational elements, effectors, and graphical displays. These components must share information with other components over the data communications network.

Legacy incarnations of these platform elements are in the form of individual subsystem elements often referred to as "federated systems". A federated system is an application-specific subsystem in a self-contained package having its own dedicated logic, processors, and input/output interfaces. Multiple and separated federated systems rely on common subsets of data sources, but lack the sharing of processing resources and interfaces among federated systems. A set of federated systems can be communicatively interconnected by utilizing separate data buses or a shared data network.

Network components utilized to construct the data network including relays, switches, communicative connections, and the like, can utilize a specialized data protocol to ensure performance of the network architecture for the specialized data. For example, the performance of the network communications in aircraft is typically defined by the Aeronautical Radio, Incorporated (ARINC) standards such as the ARINC 664 specification. Additionally, the use of Time Sensitive Networking (TSN) communication technology is growing in aircraft and avionics applications. In some instances, legacy systems using ARINC 664 schema and newer systems using TSN schema must coexist and interoperate on the same network.

BRIEF DESCRIPTION

Aspects of the disclosure relate to a converged avionics data network. The converged avionics data network includes a network switch core configured for a time-sensitive network (TSN) schema. The network also includes a first set of networking end nodes and a second set of networking end nodes, communicatively coupled with the network switch core, the first set of networking end nodes including a first subset of networking end nodes configured for first schema and second subset of networking end nodes configured for a second schema. The network switch core is configured to receive, from the first set of networking end nodes, a set of data frames, determine the respective schema of the set of data frames, police the set of data frames based on the determined respective schema using a set of predetermined rules, forward the set of data frames to a predetermined queue on an egress port of the network switch core based on the determined respective schema, and transmit the set of data frames to an end node of the second set of networking end nodes having a corresponding schema.

In yet another aspect, aspects of the disclosure relate to a method of operating a network architecture. The method includes receiving, at a set of data ingress ports for a network switch core for a TSN schema, a set of data frames from a first set of networking end nodes having a first subset of networking end nodes compliant with a first schema and a second subset of networking end nodes compliant with a second schema, for transmission to a second set of networking end nodes. The method further includes determining, with the network switch core, the respective schema of the set of data frames; policing the set of data frames based on the determined respective schema using a set of predetermined rules, forwarding the set of data frames to a queue on the network switch core based on the determined respective schema, and transmitting, by the network switch core, the set of data frames to an end node of the second set of networking end nodes having a corresponding schema.

BRIEF DESCRIPTION OF THE DRAWINGS

A full and enabling disclosure of the present description, including the best mode thereof, directed to one of ordinary skill in the art, is set forth in the specification, which refers to the appended figures, in which.

DETAILED DESCRIPTION

Aspects of the disclosure described herein are provided with respect to a specialized avionics data protocol, but it will be understood that the apparatus and method described herein can be implemented in any environment using a data communications network interconnecting a set of data-generating components with a set of data-consuming components. Aspects of the disclosure can include data communications networks configured to operate according to defined network characteristics or specifications. For example, contemporary aircraft operate a set of components interconnected by way of a data network defined by a network standard, such as the ARINC 664 specification ("A664"), or a subdivision thereof, for example, ARINC 664 part 7 specification, incorporated herein in its entirety. The A664 specification defines compliant network operations including, but not limited to, redundancy, dedicated bandwidth, deterministic quality of service, and network switching performance. While aspects of the disclosure are described with respect to the A664 specification or A664 data frames, transmissions, and the like, the disclosure can be applicable to any legacy data transmissions. As used herein, "A664 schema" can refer, without limitation, to networks, components, elements, units, nodes, end stations, end systems, hubs, switches, bridges, controls, modules, pathways, data, data frames, traffic, protocols, operations, transmissions, and combinations thereof, that adhere to, or are compliant with, one or more of ARINC 664 specifications.

Additional, updated or new network standards can be incorporated into contemporary aircraft in order to operate the set of interconnected components. In some instances, it is desirable to ensure the updated or new network standards are compatible with legacy systems, such as the A664 specification, or A664 data transmissions. One non-limiting example of updated or new network standards can include time-sensitive networking (TSN) based standards, specifications, or transmission schemas. A further non-limiting example of a TSN based standard can include network operations in accordance with the Institute of Electrical and Electronics Engineers (IEEE) 802.1 TSN schemas. Additional TSN schemas can be included. As used herein, "TSN schema" can refer, without limitation, to networks, components, elements, units, nodes, hubs, switches, bridges, end stations, end systems, controls, modules, pathways, data, data frames, traffic, protocols, operations, transmissions, and combinations thereof, that adhere to, or are compliant with, one or more of IEEE 802.1 TSN standards.

While "a set" of, and "a subset" of, various elements will be described, it will be understood that "a set" and "a subset" can include any number of the respective elements, including only one element. Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements.

As used herein, a "system" or a "controller module", or a "processing module", or a "policing module", or a "shaper module" can include at least one processor and memory. Non-limiting examples of the memory can include Random Access Memory (RAM), Read-Only Memory (ROM), non-volatile memory (NVM, such as flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types. Suitable processor-readable media may also include transmission media such as electrical, electromagnetic, or digital signals, conveyed via a communication medium such as a network and/or a wireless link.

The exemplary drawings are for purposes of illustration only and the dimensions, positions, order and relative sizes reflected in the drawings attached hereto can vary.

Figure 1:
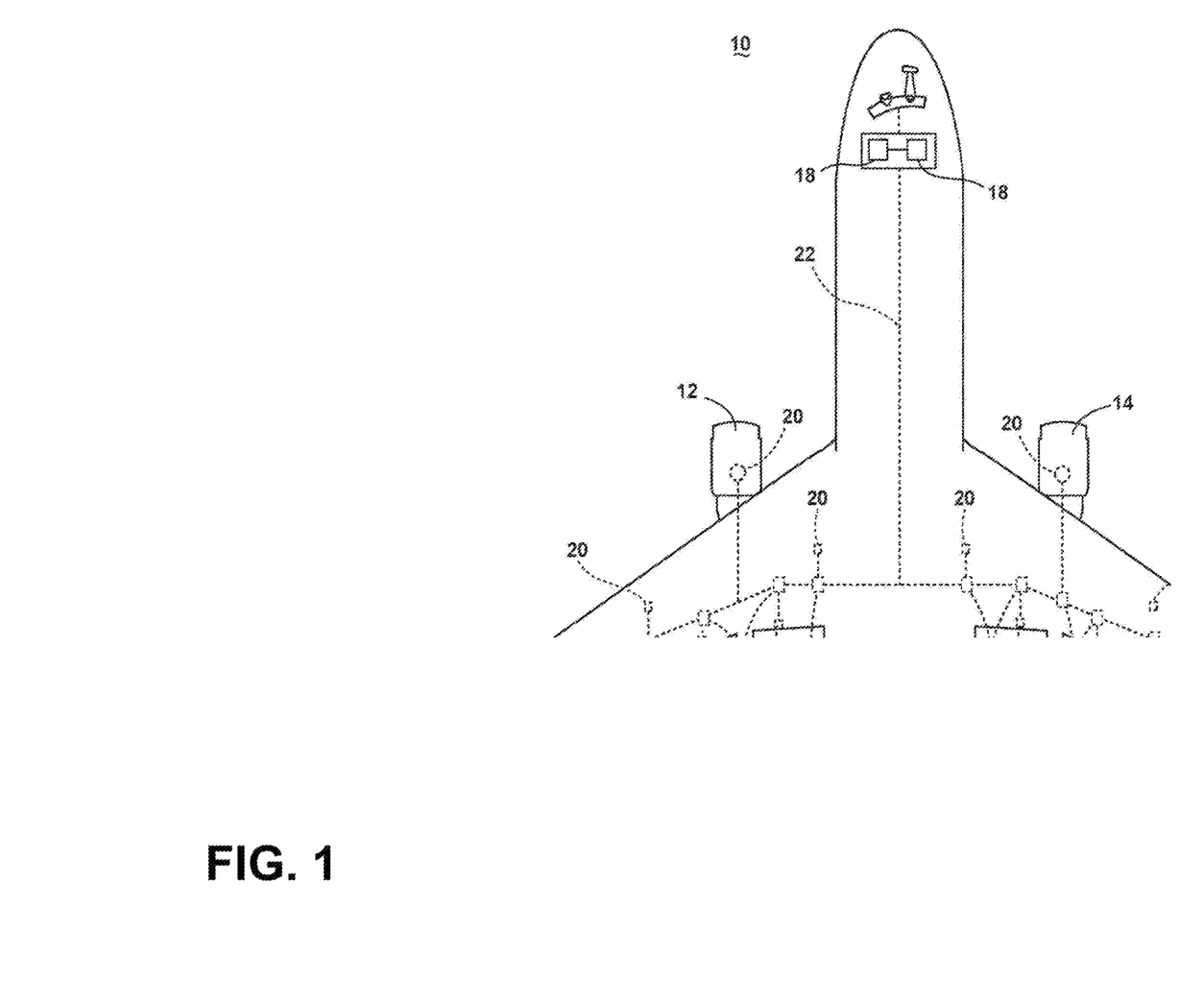
FIG. 1 is a top down schematic view of an example aircraft and avionics data network architecture of an aircraft, in accordance with various aspects described herein.

As illustrated in FIG. 1, an aircraft 10 can include at least one propulsion engine, shown as a left engine system 12 and right engine system 14. The aircraft 10 can further include one or more aircraft computers 18, including, but not limited to data storage or processing units, or functional systems such as the flight management system or autopilot system, and a set of fixed aircraft components, such as line-replaceable units (LRU) 20, networking end nodes (also referred to as "end stations" and "end systems"), or modular components of a vehicle or aircraft. In the aircraft environment, the aircraft computers or LRUs 20 can be designed to operate according to a particular operation, interoperability, or form factor standards, such as those defined by ARINC664 series standards. In the exemplary aspects illustrated, the aircraft computers 18 can be positioned near the nose or cockpit of the aircraft 10 and the LRUs 20 can be positioned throughout the aircraft 10. The aircraft computers 18 and LRUs 20 can be configured to be communicatively coupled by way of a series of data transmission pathways 22, and network bridges or switches 16. The data transmission pathways 22 can include a physical connection between the respective components 18, 20, such as a wired connection including Ethernet, or can include wireless transmission connections, including, but not limited to, WiFi (e.g. 802.11 networks), Bluetooth, and the like. Collectively, the aircraft computers 18, LRUs 20, data transmission pathways 22, and network switches 16 can form an avionics data network for the aircraft.

The LRUs 20 can include, for example, entirely contained systems, sensors, radios, or other auxiliary equipment to manage or operate aircraft functions. At least a set of aircraft computers 18 or LRUs 20 can, for example, generate data, which can be modified, computed, or processed prior to, or in preparation for packaging the data into data frames to be transmitted over the avionics data network by way of the data transmission pathways 22 or network switches 16. At least another set of aircraft computers 18 or LRUs 20 can, for example, consume the data transmitted over the avionics data network. In some instances, a single aircraft computer 18 or LRU 20 can operate to both generate and consume data. As used herein, "consume," "consuming," or "consumption" of data will be understood to include, but is not limited to, performing or executing a computer program, routine, calculation, or process on at least a portion of the data, storing the data in memory, or otherwise making use of at least a portion of the data.

The illustrated aircraft 10 is merely one non-limiting example of an aircraft 10 that can be used in aspects of the disclosure described herein. Particularities of the illustrated aircraft 10 aspects, including relative size, length, number of engines, type of engines, and location of various components are not germane to the aspects of the disclosure, unless otherwise noted.

In some example components, such as the aircraft computers 18 or LRUs 20, the components can be removably fixed to the aircraft for maintenance, diagnostics, or repair purposes, but statically fixed during, for example, flight. Additionally, while aircraft computers 18 and LRUs 20 are described, any data generating or data receiving or consuming components fixed relative to an aircraft can be included as aspects of the disclosure as fixed components. For example, systems such as a flight management system, primary flight display, cockpit display system, autopilot, or auto-land systems can be considered fixed components, as used herein.

Figure 2:
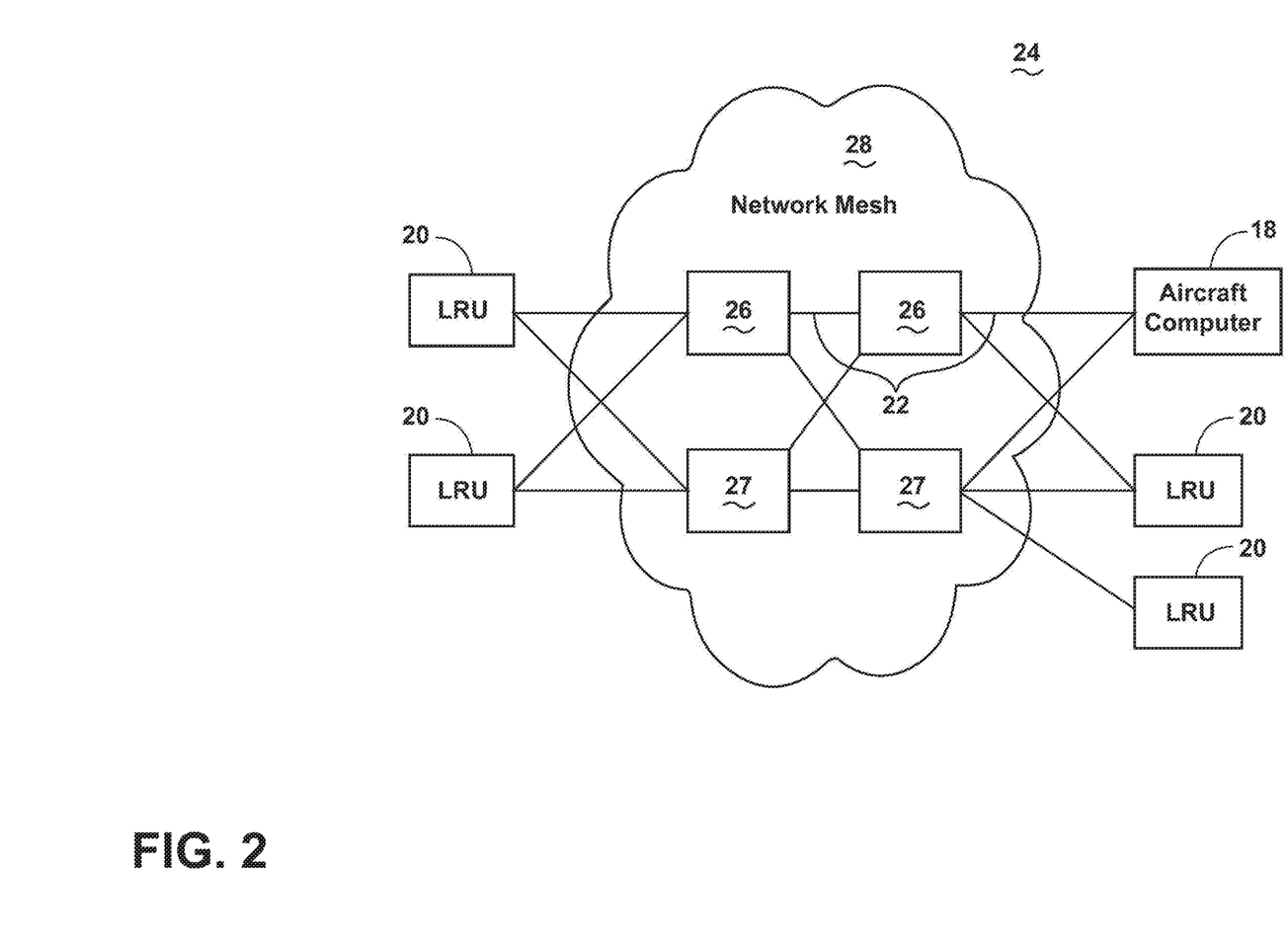
FIG. 2 is a schematic view of an example avionics data network, in accordance with various aspects described herein.

FIG. 2 illustrates a non-limiting schematic view of an avionics data network 24, according to aspects of the disclosure. The avionics data network 24 can include, but is not limited to, a set of redundant network bridges or switching units, such as a first set of network switching units 26 defining a first path and a second set of network switching units 27 defining a second, or redundant, path. The first set of network switching units 26 and the second set of network switching units 27 collectively define a network mesh 28 for routing the transmission of data (e.g., data frames) to and from the aircraft computer 18 and LRUs 20, via the data transmission pathways 22. The network mesh 28 is further shown having a set of data transmission pathways 22 between the network switching units 26 and LRUs 20 to provide redundancy in data transmission pathways 22. In one non-limiting example, the network mesh 28, the first set of network switching units 26, the second set of network switching units 27, or a combination thereof, can be arranged, configured, or otherwise enabled to utilize a TSN schema.

The aspects of the disclosure illustrated in FIG. 2 is merely one representation of the avionics data network 24, and alternative configurations, organization, and component quantities, including, but not limited to, aircraft computers 18, LRUs 20, or network switching units 26, are envisioned.

Figure 3:
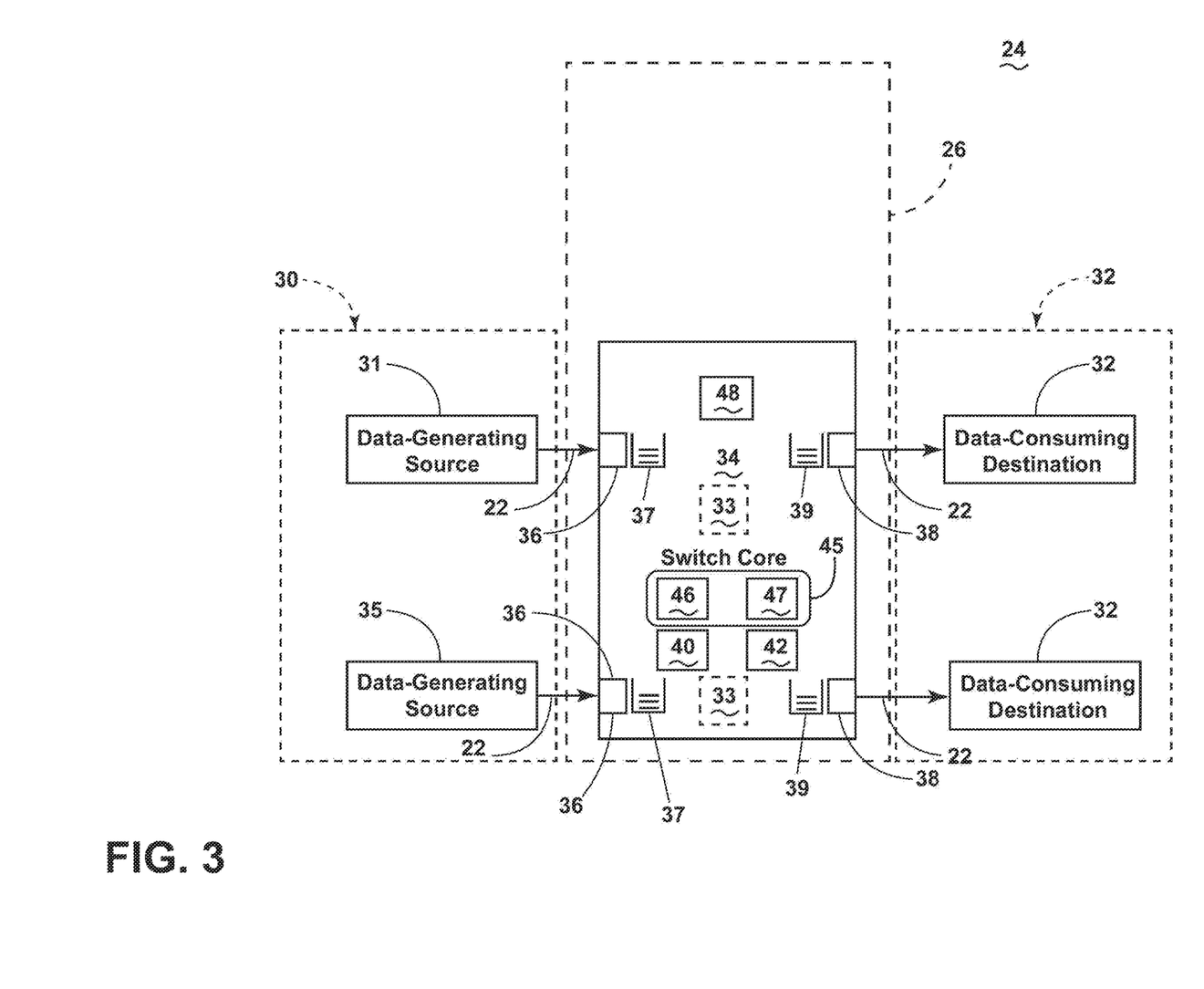
FIG. 3 is a schematic view of a network switch of a converged avionics data network, in accordance with various aspects described herein.

Turning now to FIG. 3, a simplified avionics data network 24 is illustrated, comprising a first set of networking end nodes 30 communicatively coupled to a second set of networking end nodes 32. As depicted, the first set of networking end nodes 30 can be a set of data-generating sources, and the second set of networking end nodes 32 can be a set of data-consuming destinations. The first set of networking end nodes 30 can be communicatively coupled to the second set of networking end nodes 32 by way of one or more network switching units 26 via corresponding data transmission pathways 22. While FIG. 3 depicts only a single network switching unit 26 for ease of understanding, it will be understood that any number of, or subset of, the network switching units 26 of the avionics data network 24 can be further included or configured, as shown. Moreover, as explained above, the data-generating sources of the first set of networking end nodes 30 or data-consuming destinations of the second set of networking end nodes 32 can include any of the aforementioned aircraft computers 18 or LRUs 20, and can be referred to herein as sources 30 or destinations 32 to provide a directional description of the data transmission. In this sense, each of the sources 30 or destinations 32 can be considered a networking end node 30, 32.

Additionally, the first set of networking end nodes 30 can include a first subset of networking end nodes 31 configured for a first schema, and a second subset of networking end nodes 35 configured for a second schema. For example, in an aspect, the first subset of networking end nodes 31 can be configured to be compliant with one or more of ARINC 664 standards, and referred to herein as ARINC 664 end nodes 31. In other aspects, the first subset of networking end nodes 31 can be configured to be compliant with, one or more of TSN standards, and referred to herein as TSN end nodes 31. In an aspect, the second subset of networking end nodes 35 can be configured to be compliant with, one or more of TSN standards, and referred to herein as TSN end nodes 35. In other aspects, the second subset of networking end nodes 35 can be configured to be compliant with one or more of ARINC 664 standards, and referred to herein as ARINC 664 end nodes 35. In some aspects, the first and second schema can be the same schema.

The network switching unit 26 can further comprise a switch core 34 having a set of ingress ports 36, a set of egress ports 38, switching logic 40, a controller module 42, a shaper module 48, and a policing module 45. In some aspects, the policing module 45 can include a first policing module 46, and a second policing module 47. In still other aspects, the policing module 45 can be omitted. Each respective ingress port 36 can include an associated ingress memory buffer 37, and each respective egress port 38 can include an associated egress memory buffer 39 or egress port queue. The memory size and capabilities of the respective memory buffers 37, 39 can vary, as desired.

The switch core 34 can be configured to communicatively couple with the first set of networking end nodes 30 via the data transmission pathways 22 received at respective ingress ports 36 of the switch core 34. The first set of networking end nodes 30 are configured to supply, deliver, send, or otherwise transmit networking data, network communications, data frames, data packets, or the like (hereafter, "data frames 33"), to the switch core 34. In various aspects, the networking end nodes of the first set of networking end nodes 31 can be compliant with either A664 schema, or TSN schema, or both. Likewise, in various aspects, the networking end nodes of the second set of networking end nodes 32 can be compliant with either A664 schema, or TSN schema, or both. It will be further appreciated that in some aspects, the networking end nodes of the first subset of networking end nodes 31 can transmit data frames 33 in accordance with an A664 schema, and the end nodes of the second subset of networking end nodes 35 can transmit data frames 33 in accordance with a TSN schema. Additionally, the switch core 34 can be compliant with TSN schema and communicatively coupled with the data-consuming end nodes of the second set of networking end nodes 32 via the data transmission pathways 22 received in the respective egress ports 38 of the switch core 34 and transmit data frames 33 to one or more of the second set of networking end nodes 32 from the switching switch core 34. It will be understood that the data frames 33 can include at least a portion of data defining the respective networking end node 30 source of the respective data frame 33, as well as the predetermined data-consuming destination or destinations of the second set of networking end nodes 32 of the respective data frame 33.

As shown, the switch core 34 provides a respective ingress port 36 or egress port 38 for the data-generating sources of the first set of networking end nodes 30 or data-consuming destinations of the second set of networking end nodes 32, however alternative configurations are envisioned. For example, one alternative configuration envisions a single ingress or egress port 36, 38 is configured to couple with another network switching unit 26, and can thus carry data frames 33 for any data-consuming destination of the second set of networking end nodes 32 coupled with the another network switching unit 26. In this sense, in non-limiting aspects, the switch core 34 can be in, for example, unidirectional communication with the data-generating sources of the first set of networking end nodes 30 (i.e. only receiving data frames 33 from the source or networking end node 30) and data-consuming destinations of the second set of networking end nodes 32 (i.e. only transmitting data frames 33 to the destination or networking end node 32).

A first set of data transmission pathways 22 and ingress ports 36 or egress ports 38 of the switch core 34 can be defined by a particular pathway or communication schema utilized, for example, the A664 specification. For instance, when the transmission pathway 22 is an Ethernet link or cable, the set of ingress ports 36 and set of egress ports 38 can include physical interfaces, such as Ethernet ports configured to operate at, for example, 10/100 or Gigabit per second (or faster) bandwidth speeds over copper or optical media. In another instance when the data transmission pathway 22 is a wireless transmission, the set of ingress and egress ports 36, 38 can be one or more antennas. A second set of data transmission pathways 22 and ingress or egress ports 36, 38 of the switch core 34 can alternatively or additionally be defined by a different particular data transmission pathway 22 or communication schema utilized, for example, a TSN schema. Furthermore, in yet another non-limiting example, the network switching unit 26 can be configured or adapted to utilize the TSN schema, and thus, incorporating aspects of the disclosure to enable or otherwise facilitate legacy communications with otherwise incompatible transmission of data frames 33. In the non-limiting example described, the A664 communications or data frames 33 generated by A664 schema data-generating sources of the first subset of networking end nodes 31, or consumed by A664 schema data-consuming destinations of the second set of networking end nodes 32, can be communicated or transmitted via a TSN schema switching unit 26 via the TSN schema switch core 34. Additionally, the TSN schema data frames 33 generated by TSN schema data-generating sources of the second subset of networking end nodes 35, or consumed by TSN schema data-consuming destinations of the second set of networking end nodes 32, can be communicated or transmitted via the TSN schema switching unit 26 via the TSN schema switch core 34.

The switching logic 40 and the controller module 42 of the switch core 34 can operate together to route the data frames 33 of or through the switch core 34, as needed. For example, the controller module 42 can further include a processor and suitable memory for including a portion of a computer program having an executable instruction set for controlling the operation of the controller module 42 or switching logic 40. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc. that have the technical effect of performing particular tasks or implement particular abstract data types. In implementation, the one or more functions or routines of the controller module 42 can be converted to a computer program comprising a set of executable instructions, for execution by the controller or controller module 42.

In an aspect, the controller module 42 of the switch core 34 can determine the respective schema of a received set of data frames 33. For example, the controller module 42 can be configured to determine whether the received data frame 33 is an A664 schema data frame (e.g., generated by a A664 schema data generating source of the first subset of networking end nodes 31), or a TSN compatible data frame (e.g., generated by a TSN schema data generating source of the second subset of networking end nodes 35). In one instance, the controller module 42 can determine the respective schema of a data frame 33 based on the particular transmission pathway 22 or ingress port 36 utilized to transmit the data frame 33 to the switch core 34. For example, in an aspect, a particular data transmission pathway 22 can be reserved or dedicated to transmitting data frames 33 associated with a predetermined schema (e.g., an A664 schema), while another particular data transmission pathway 22 can be reserved or dedicated to transmitting data frames 33 associated with another predetermined schema (e.g., a TSN schema).

In other aspects, the controller module 42 can determine the respective schema of a received data frame 33 based on the particular data generating source of the first set of networking end nodes 30 that provided the data frame 33. For example, in an aspect, a particular data generating source of the first set of networking end nodes 30 can be compliant with a predetermined schema (e.g., an A664 schema) and configured to provide data frames 33 in accordance with the predetermined schema. Upon receipt of a data frame 33, the controller module 42 can determine or identify the particular data generating source of the first set of networking end nodes 30 that provided the data frame 33, (for example, by using a look-up table) and thereby determine the respective schema of the received data frame 33 based on the determined data generating source of the first set of networking end nodes 30. In still other aspects, the controller module 42 can likewise determine the respective schema of a data frame 33 based on the intended or ultimate data consuming destination of the second set of networking end nodes 32 of the data frame 33.

In other aspects, the controller module 42 can be configured to determine the respective schema of the received set of data frames 33 based at least partially on information or data within the data frame 33. For example, in a non-limiting aspect, the controller module 42 can determine the respective schema of the received set of data frames 33 based at least partially on information in an Ethernet header of the data frame 33. In still other aspects, the controller module 42 can be configured to determine the respective schema of the received set of data frames 33 based on a predetermined pattern, such as a byte pattern, in a portion of the data within the data frame 33.

In an aspect, the controller module 42 can optionally include a policing module 45. For example, in a non-limiting aspect, the policing module 45 can be an ingress-type policing module 45 configured to police or filter the data frames 33 received at an ingress port 36 based upon predetermined policing or filtering rules. The predetermined policing rules can be further based upon the determined respective schema of the data frame 33 received by the switch core 34.

In non-limiting aspects, the policing module 45 can comprise a first policing module 46, and a second policing module 47. The first policing module 46 can police or filter the data frames 33 determined to be in accordance with A664 schema, and the second policing module 47 can police or filter the data frames 33 determined be in accordance with TSN schema. For example, in an aspect, a data frame 33 determined to have a A664 schema can be policed by the first policing module 46 based on data policing rules in accordance with A664 schema protocols. In other aspects, a data frame 33 determined to have a TSN schema can be policed by the second policing module 47, based on data policing rules in accordance with schema protocols. In still other aspects the policing module 45 can be a hybrid TSN/A664 policing module, configured to police or filter data frames 33 received at an ingress port 36 based upon at least one of TSN and A664 policing or filtering rules.

In an instance, the policing module 45 can be configured to make a determination if a data frame 33 received at an ingress port 36 is validated, verified, or authorized to arrive from the receiving ingress port 36. When an arriving data frame is received at an invalid, unverified, or unauthorized receiving ingress port 36, the policing module 45 can be configured to command the switching logic 40 to, for example, ignore or drop the data frame 33 without forwarding the data frame 33 on to a destination end node of the second set of networking end nodes 32. In this sense, the policing module 45 can be configured to ensure only authorized data frames 33 are transmitted through the avionics data network 24 or network switching unit 26.

In aspects, the policing module 45 can implement, perform, or execute the policing or filtering functions with a processing module that functions with software programs, firmware or other computer readable instructions for carrying out various methods, process tasks, calculations, and control functions, used in the policing or filtering functions.

In an instance, the controller module 42 can command the switching logic 40 to forward or move or otherwise assign the data frames 33 to a queue (i.e., a transmission queue) in the egress memory buffer 39 for transmission from the switch core 34 to an intended data-consuming destination of the second set of networking end nodes 32. In some aspects, the controller module 42 can command the switching logic 40 to forward data frames 33 to a transmission queue in the egress memory buffer 39 by assigning the data frames 33 in real time based on the determined respective schema of the data frames 33. In other embodiments, the controller module 42 can determine the transmission queue based on source, destination, or some other information in the data frame. In other aspects, the controller module 42 can command the switching logic 40 to forward data frames 33 to a transmission queue in the egress memory buffer 39 by assigning the data frames 33 to a predetermined queue in the egress memory buffer 39. In aspects, the controller module 42 can select the queue based on the determined schema of the data frame 33. In a non-limiting example, based on the determined schema of the data frame 33, the controller module 42 can place the received data frames 33 in a predetermined sequential first-in, first-out (FIFO) transmission queue, to retain timing or ordering priority. In some aspects, the controller module 42 can determine the transmission queue based on the source, destination, or some other information in the data frame (e.g. in a header) after receiving a portion of the data frame (i.e., prior to receiving the complete data frame 33) in order to achieve low latency communication through the switch.

In one instance, the controller module 42 can determine the intended data-consuming destination of the second set of networking end nodes 32 for a data frame 33 supplied to an ingress port 36 of the switch core 34, based at least partially on the data within the data frame 33. The controller module 42 can then command the switching logic 40 to route and forward the data frame to the egress port 38 (or an associated egress memory buffer 39 thereof) associated with the predetermined data-consuming destination end node of the second set of networking end nodes 32 for delivery thereto.

In various aspects, the controller module 42 can further include a shaper module 48. The shaper module 48 can be configured to perform or execute shaping of the data frames 33 in the assigned queue for delivery or selective transmission to a predetermined data-consuming destination of the second set of networking end nodes 32. In aspects, the shaper module 48 can be a synchronous type, or time-aware, shaper module 48, or scheduler. In other aspects, the shaper module 48 can be an asynchronous type, or rate constrained, shaper module 48. In still other aspects, the shaper module 48 can be a priority-based shaper such as a strict priority shaper. Regardless of the type of shaper module 48 used, the shaper module 48 can selectively deliver or transmit the data frames 33 in an assigned queue to a predetermined data consuming destination of the second set of networking end nodes 32 using any number of predetermined parameters or rules. For example, the predetermined rules can be selected to ensure a desired quality of service (QoS) parameter is met. For example, in non-limiting aspects, the shaper module 48 can be configured to schedule the delivery of data frames 33 in an assigned queue in the egress memory buffer 39 in accordance a TSN schema (for example, in compliance with IEEE Standard 802.1 Qbv). In such an aspect, the shaper module 48 can comprise a time-aware type shaper (TAS) as defined in IEEE 802.1Q-2018.

In other non-limiting aspects, the shaper module 48 can control the delivery of data frames 33 based on a predetermined set of parameters having predefined values. The predetermined parameters can be selected to meet a predefined or desired system QoS performance parameter. By way of non-limiting example, the predetermined set of parameters can include, without limitation, any one or more of a predetermined cycle time (e.g., based on a predetermined time period over which a transmission gate (not shown) associated with each transmission queue of the switch core 34 opens and closes to transmit and prevent transmission, respectively, of the data frames 33), a bandwidth allocation gap (i.e., the minimum time duration between two consecutive data frames 33), a time limit for transmitting the data frame 33 from the transmission queue in the egress memory buffer 39 to an intended data-consuming destination of the second set of networking end nodes 32, predetermined gate control logic, predetermined gate states, administrative base time, or various combinations thereof.

For example, in some non-limiting aspects, the shaper module 48 can be a time-aware type shaper module 48 employing a predetermined cycle time in compliance with IEEE Standard 802.1 Qbv, and an A664 schema networking end node of the first subset of networking end nodes 31 can be configured to employ an effective bandwidth allocation gap ("BAG") that is an integer multiple of the cycle time of the shaper module 48. As used herein, an "effective BAG" is a TSN schema representation of an A664 schema BAG value. In another non-limiting example, the shaper module 48 can be a time-aware type shaper module 48 having a predetermined cycle time in compliance with IEEE Standard 802.1 Qbv, and an A664 schema end node of the first subset of networking end nodes 31 can be configured to employ an effective BAG that is an integer divisor of the cycle time of the shaper module 48. In still other non-limiting aspects, the shaper module 48 can be configured to shape the set of data frames 33 for transmission to meet a band allocation gap requirement of at least one networking end node of the second set the second set of networking end nodes 32.

In some aspects, a A664 schema networking end node of the second set of networking end nodes 32 can be configured to employ an effective BAG that is one of an integer multiple of a cycle time that is in compliance with IEEE Standard 802.1 Qbv. In other aspects, an A664 schema networking end node of the second set of networking end nodes 32 can be alternatively be configured to employ an effective BAG that is an integer divisor of a cycle time that complies with IEEE Standard 802.1 Qbv.

In still other non-limiting aspects, the shaper module 48 can be configured to schedule delivery of received data frames 33 to the respective intended data consuming destination of the second set of networking end nodes 32 to occur within the same cycle in which the respective data frame 33 was transmitted by a data generating source of the first subset of networking end nodes 31. In this way, the shaper module 48 can schedule the delivery of data frames 33 from the transmission queue in egress memory buffer 39 such that a latency of any data frame 33 does not exceed a predetermined cycle time.

In other aspects, the A664 schema nodes of the first subset of networking end nodes 31 can be configured to group the transmission of data frames 33 (e.g., break apart their transmission) into different streams such that longest transmission from any end node of the first subset of networking end nodes 31 does not exceed the smallest bandwidth allocation gap of any other of the first subset of networking end nodes 31, when the transmissions from those two networking end nodes to their respective destinations share a common link or data transmission pathway 22 between them.

It is also contemplated that, in some aspects, a networking end node 31, 35 of the first set of networking end nodes 30 can alternatively be configured to shape a set of data frames 33 for transmission without need of the shaper module 48. In such aspects, the end nodes 31, 35 can comprise one of a synchronous, asynchronous, or priority-based shaper. For example, the end node 31, 35 can include a synchronous shaper and determine schedule for the delivery of the set of data frames 33 prior to the transmission of the set of data frames 33 by the end node 31, 35.

The shaper module 48 can implement, perform, or execute the shaping and scheduling functions with a processing module that functions with software programs, firmware or other computer readable instructions for carrying out various methods, process tasks, calculations, and control functions, used in the scheduling functions.

In another non-limiting instance, the controller module 42 can be adapted or configured to determine whether the A664 data frames 33 received from data-generating sources of the first subset of networking end nodes 31 can be delivered or communicated by the TSN schema network switching unit 26 or switch core 34. In this sense, and in accordance with the TSN schema, the controller module 42 can receive, or define a time-based allocation for delivering A664 schema and TSN schema network traffic in accordance with the TSN schema. Also in accordance with a TSN schema, the time-based allocation for delivering network traffic (e.g., data frames 33) can be at least partially based on allocated time slots for particular message delivery (e.g. specific data, or specific communications between at least one data-generating source of the first set of networking end nodes 30 or data-consuming destination of the second set of networking end nodes 32 is allocated a specific portion of time on the network to deliver related network traffic) or unallocated time slots (wherein no specific data or communications are allotted to the respective time slot for delivery). In non-limiting examples, the allocated and unallocated time slots can be dynamically configured (e.g. at startup), manually configured (e.g. in firmware), or defined by a component of the network, including but not limited to the network switching unit 26, the switch core 34, the controller module 42, another networking component, or a combination thereof.

For instance, the controller module 42, in addition to determining the respective schema of the received set of data frames 33, can also be configured to identify unallocated, or even under-utilized allocated time slots, and arrange, provide for, enable, or otherwise ensure A664 data frames 33 are delivered by way of the TSN schema network switching unit 26 or switch core 34 during those unallocated under-utilized allocated time slots. In other aspects, the controller module 42 can be provided with a schedule for the transmission of the set of data frames based on predetermined unallocated time slots. For example, the unallocated time slots can be determined prior to receiving the set of data frames.

In another non-limiting example, the controller module 42 can facilitate the A664 data frame 33 delivery by commanding, instruction, controllably delivering, or otherwise selectively scheduling the delivery of at least a subset of the data frames 33 by way of the switching logic 40 or controller module 42 of the switch core 34. In yet another non-limiting example, the controller module 42 can facilitate or prepare for the delivery, if for example, the selectively scheduled delivery is during a future time period, by arranging or enabling the A664 data frames 33 to be copied into the egress memory buffer 39.

In an aspect, the switch core 34 can be configured to support one or more of a TSN schema frame replication and elimination for reliability functions. For example, the data frames 33 sent from the first subset of networking end nodes 31 can comprise A664 redundant data frames 33. In a non-limiting aspect, the switch core 34 can be configured to determine that a first redundant networking data frame 33 has been received by a networking end node of the second set of networking end nodes 32, and if so, to block, or otherwise prevent a second redundant networking data frame 33 (i.e., identical to the first redundant networking data frame 33) from being transmitted to the networking end node of the second set of end nodes 32.

Upon reaching the selectively scheduled time slot, the switch core 34 or the network switching unit 26 can operably deliver the A664 data frames 33 from the egress port(s) 38 to another A664 based networking end node, such as one or more of the set of data-consuming destinations 32 of the second set of networking end nodes 32.

In another non-limiting example, aspects of the disclosure can be included wherein the switch core 34 can be further configured to determine or ensure a respective A664 data frame 33 can be completely delivered (e.g. fully, without truncating) during the selected delivery time slot. For instance, if a set of data frames 33 have been queued (e.g. in the egress memory buffer 39), a subset of data frames 33 may not be deliverable based on the time slot. The switch core 34 can be configured to estimate, predict, determine, or otherwise allocate a set of data frames 33 that are sure to be delivered in the selected time slot, and either hold, retain, buffer, exclude, or drop data frames 33 that are determined to be not deliverable or not completely deliverable during the selected time slot. In one non-limiting example, the delivery of the A664 data frames 33 can be based on a first-in, first-out (FIFO) arrangement.

Once scheduled, the data frames 33 can be transmitted, by the switch core 34, to an end node of the second set of networking end nodes 32 having a corresponding schema. In an aspect, the switch core 34, can transmit the set of data frames 33, without modification of the set of data frames 33, to a data consuming end node of the second set of networking end nodes 32 having a corresponding schema In this sense, aspects of the disclosure can enable or allow for the delivery of at least a subset of A664 data frames 33 by way of a TSN based network schema, whereby the controller module 42 operations are configured to render the otherwise incompatible A664 data frames 33 compliant with the TSN schema. It will be appreciated that aspects of the disclosure can likewise enable or allow for the delivery of at least a subset of TSN data frames 33 by way of the TSN based network schema.

Figure 4:
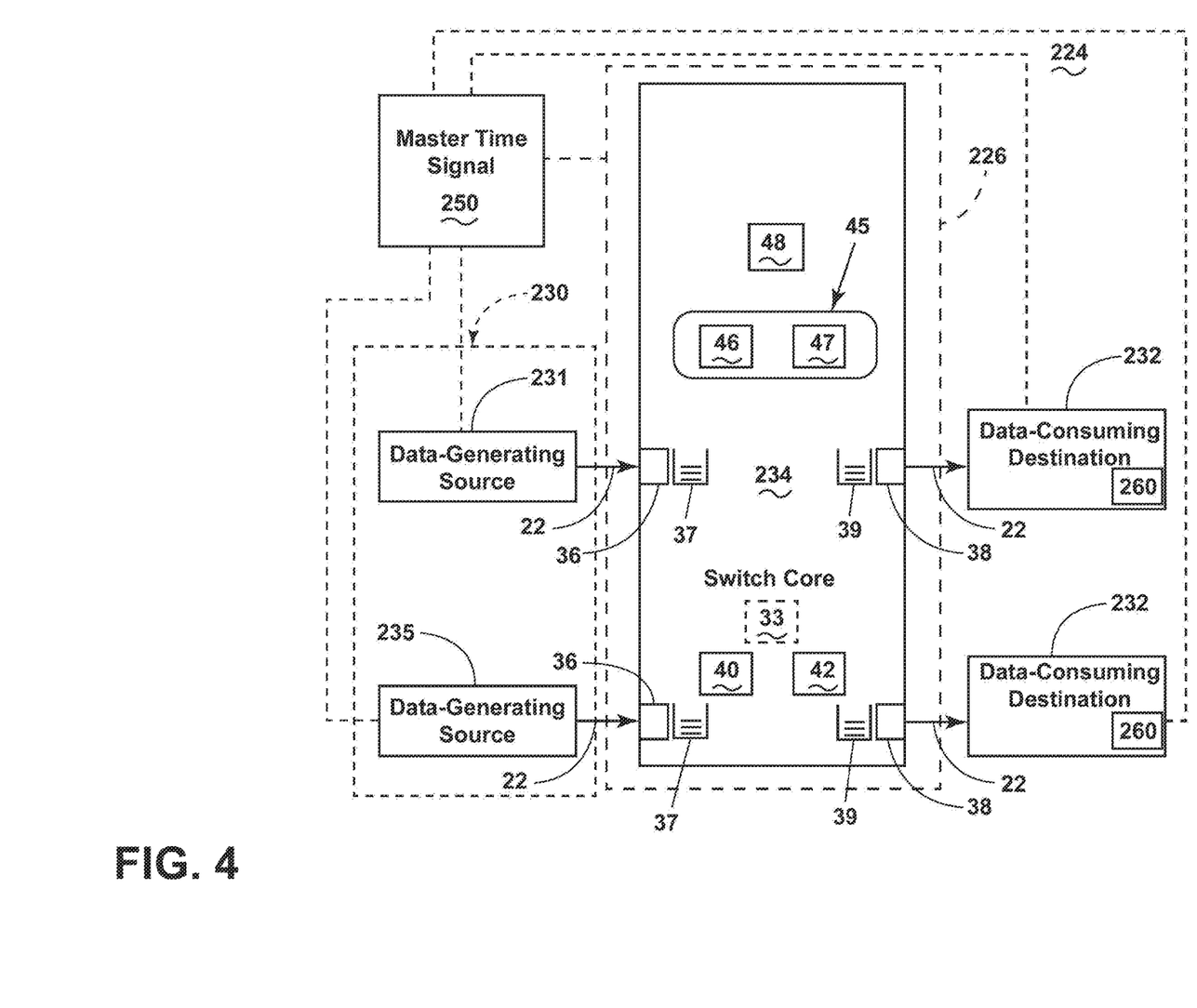
FIG. 4 is a schematic view of a network switch of a converged avionics data network having a master time signal, in accordance with various aspects described herein.

FIG. 4 illustrates another avionics data network 224 according to another aspect of the present disclosure. The avionics data network 224 is similar to the avionics data network 24, therefore, like parts will be identified with like numerals increased by 200, with it being understood that the description of the like parts of the avionics data network 24, applies to the avionics data network 224, unless otherwise noted. One difference is that the avionics data network 224 can include a master time signal 250 that is provided to at least a subset of the following components: the data-generating sources of the first set of networking end nodes 230, the data-consuming destinations of the second set of networking end nodes 232, or the network switching unit 226. In this sense, the subset of components 226, 230, 232, 235 can receive a time synchronization value (e.g. a "master time") from the master time signal 250 for at least partial synchronization of operations. Another difference, as discussed in more detail herein, is that the data-consuming destinations of the second set of networking end nodes 332 can further include a reassembly module 260.

In one non-limiting example, the first subset of networking end nodes 231 can be configured or adapted to transmit, send, or provide A664 data frames 33 during a predetermined schedule, managed or regulated by the time synchronization value. In another non-limiting example, the first subset of the data-generating sources 231 can be configured or adapted to store locally (e.g. at the data-generating source, for instance in a memory buffer, not shown), and to send the locally stored A664 data frames 33 during the predetermined schedule.

In other aspects, the data-consuming destinations of the second set of networking end nodes 232 or the network switching unit 226 can be configured or adapted to enable the splitting or separation of a single A664 schema, or a TSN schema, data frame 33 into a set of data frames 33 or messages to be reassembled at a later time or at a downstream destination.

For example, aspects of the disclosure can be included wherein the switch core 234 can be further configured to determine or ensure a respective A664 data frame 33 can be completely delivered (e.g. fully, without truncating) during the selected delivery time slot. Aspects can be adapted or configured to determine whether a respective A664 data frame 33 can be completely delivered during the selected delivery time slot, and if not, to separate the respective A664 data frame 33 into a first A664 networking message and a second A664 networking message. In this example, the first A664 networking message can be scheduled for delivery, while the second A664 networking message can be further scheduled during the next unallocated or available time slot.

The data-consuming destination of the second set of networking end nodes 332 can optionally further include a reassembly module 260 that can be adapted or configured to receive each of the first and second A664 networking messages, and reassemble them to the original A664 data frame 33.

Figure 5:
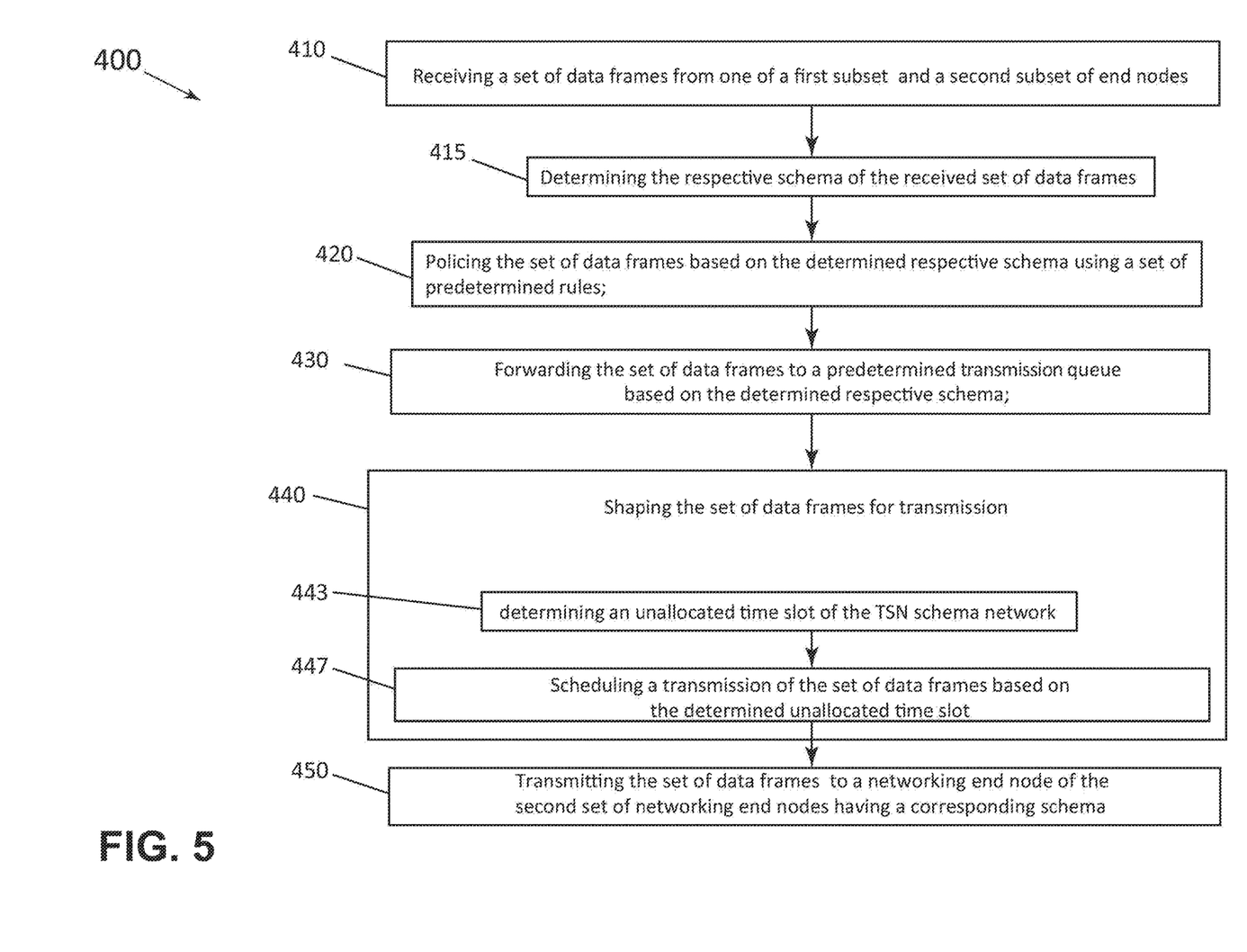
FIG. 5 is a flow chart showing a method of operating a converged avionics data network, in accordance with various aspects described herein.

FIG. 5 illustrates a flow chart demonstrating a method 400 of operating an avionics data network 24. The method 400 begins by receiving, at a set of ingress ports 36 for a network switch core 34 for a time-sensitive networking (TSN) schema network, a set of data frames 33 from a first set of networking end nodes 30 having a first subset of networking end nodes 31 compliant with a first schema and a second subset of networking end nodes 35 compliant with a second schema, for transmission to a second set of networking end nodes 32 of the network 24 at 410. In an aspect the first schema can be an A664 schema, and the second schema can be a TSN schema. The method includes determining, by a controller module 42 the respective schema of the received set of data frames 33, at 415.

Next, the method 400 includes policing the received set of data frames 33 based on the determined respective schema using a set of predetermined rules, at 420. The method 400 includes forwarding the data frames 33 to a transmission queue based on the determined respective schema, at 430. In an aspect, the transmission queue can be determined prior to receiving the data frames 33. At 440, the method includes shaping the data frames 33 for transmission based on the determined transmission queue, using one of a synchronous shaper and asynchronous shaper. For example, in non-limiting aspects, the shaping of the data frames 33 for transmission can include selectively scheduling the transmission of the data frames 33 to a data consuming destination of the second set of networking end nodes 32 based on a predetermined schedule.

In some aspects, the scheduling at 440 can include determining, an available or unallocated time slot of the TSN schema network, at 443. In non-limiting aspects, the determining an unallocated time slot of the TSN schema network can be done prior to receiving the data frame 33. In an aspect the unallocated time slot can be provided to the network switch core 34 prior to receiving the data frames 33. The method 400 can include selectively shaping, by the controller module 42 a transmission of the set of data frames 33 based on the determined unallocated time slot, at 447. The selectively shaping the set of data frames 33 can be done using a time-aware scheduler. The method 400 proceeds to transmitting, by the switch core 34, the set of data frames 33, to an end node of the second set of networking end nodes 32 having a corresponding schema. For example, the transmitting of the data frames 33 can be done during the determined unallocated time slot, at 450. In some aspects, the transmitting of the set of data frames 33, by the switch core 34, to an end node of the second set can be done without modification of the set of data frames 33, to an end node of the second set of networking end nodes 32 having a corresponding schema can be done without modification of the set of data frames 33. The operations are configured to render the A664 communications compliant with the TSN schema.

The sequence depicted is for illustrative purposes only and is not meant to limit the method 400 in any way as it is understood that the portions of the method can proceed in a different logical order, additional or intervening portions can be included, or described portions of the method can be divided into multiple portions, or described portions of the method can be omitted without detracting from the described method. For example, the method 400 can further include determining, by the switch core 34, whether at least a subset of the data frames can be completely delivered during the next available unallocated time slot, or delivering the set of data frames further includes delivering the subset of the data frames determined to be completely delivered during the next available unallocated time slot. In yet another example aspect of the method 400 can include shaping of the set of data frames 33 for transmission using an asynchronous shaper at 440. In such an aspect, the shaping of the set of data frames 33 for transmission can include determining an available credit and selecting one or more data frames 33 for transmission based on available credit.

Many other possible aspects and configurations in addition to that shown in the above figures are contemplated by the present disclosure.

The aspects disclosed herein provide an avionics data network for receiving and delivering a set of data frames. The technical effect is that the above described aspects enable the delivery of a A664 schema data frame in a TSN schema network by enabling the delivery of the data frames 33 using the same shaper module 48 for both A664 data frames and TSN data frames. In this sense, different, otherwise non-compatible network schemas can effectively coexist on a single network. One advantage that can be realized in the above aspects is that the above described aspects will permit the use of legacy A664 equipment to be used along with equipment that supports the newer TSN protocol. Another advantage can include providing a deterministic Ethernet solution to aircraft customers, allowing, enabling, or otherwise accelerating the transition from several older network schemas to a new network schema.

To the extent not already described, the different features and structures of the various aspects can be used in combination with others as desired. That one feature cannot be illustrated in the aspects is not meant to be construed that it cannot be, but is done for brevity of description. Thus, the various features of the different aspects can be mixed and matched as desired to form new aspects, whether or not the new aspects are expressly described. All combinations or permutations of features described herein are covered by this disclosure.

This written description uses examples to disclose aspects of the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure can also be embodied in any permutation of aspects of the disclosure, including but not limited to the following technical solutions as defined in the enumerated aspects:

A converged avionics data network comprising: a network switch core configured for a time-sensitive network (TSN) schema; a first set of networking end nodes and a second set of networking end nodes, communicatively coupled with the network switch core, the first set of networking end nodes including a first subset of networking end nodes configured for first schema and second subset of networking end nodes configured for a second schema; wherein the network switch core is configured to: receive, from the first set of networking end nodes, a set of data frames; determine the respective schema of the set of data frames; police the set of data frames based on the determined respective schema using a set of predetermined rules; forward the set of data frames to a predetermined queue on an egress port of the network switch core based on the determined respective schema; and transmit the set of data frames to an end node of the second set of networking end nodes having a corresponding schema.

The avionics data network of the preceding clause, wherein the network switch core is further configured to shape the set of data frames for transmission based on the predetermined queue.

The avionics data network of any preceding clause, wherein the network switch core is configured to shape the transmission of the set of data frames using a time aware shaper (TAS) having a predefined cycle time.

The avionics data network of any preceding clause, wherein the network switch core is provided with a schedule for the transmission of the set of data frames based on an unallocated time slot determined prior to receiving the set of data frames.

The avionics data network of any preceding clause, wherein the schedule comprises a first schedule to transmit the set of data frames in accordance with the first schema, and a second schedule to transmit of the set of data frames in accordance with the second schema.

The avionics data network of any preceding clause, wherein the TAS is configured to schedule the transmission of the set of data frames to a networking end node of the second set of networking end nodes to occur within the same cycle in which the set of data frames was transmitted by a networking end node of the first subset of networking end nodes.

The avionics data network of any preceding clause, wherein the network switch core is configured to shape the transmission of the set of data frames using an asynchronous shaper.

The avionics data network of any preceding clause, wherein the first schema is an A664 schema, and the second schema is a TSN schema.

The avionics data network of any preceding clause, wherein the first subset of networking end nodes are otherwise incompatible with the TSN schema.

The avionics data network of any preceding clause, wherein the network switch core is configured to shape the set of data frames for transmission to meet an effective band allocation gap requirement of at least one networking end node of the first set of networking end nodes.

The avionics data network of any preceding clause, wherein the first subset of networking end nodes is configured to employ an effective bandwidth allocation gap that is one of an integer multiple of the cycle time of the TAS and an integer divisor of the cycle time of the TAS.

The avionics data network of any preceding clause, wherein the first subset of the networking end nodes is configured to transmit data frames to be received by the networking switch core based on one of a synchronous shaper or asynchronous shaper.

The avionics data network of any preceding clause, wherein the first subset of the networking end nodes is configured to shape the set of data frames using a time aware shaper (TAS) based on predetermined schedule.

The avionics data network of any preceding clause, wherein first subset of networking end nodes further is configured to receive a time synchronization value.

The avionics data network of any preceding clause, wherein at least one networking end node of first subset of networking end nodes is configured for both the first schema and second schema.

A method of operating a network architecture comprising: receiving, at a set of data ingress ports for a network switch core for a time-sensitive network (TSN) schema, a set of data frames from a first set of networking end nodes having a first subset of networking end nodes compliant with a first schema and a second subset of networking end nodes compliant with a second schema, for transmission to a second set of networking end nodes; determining, with the network switch core, the respective schema of the set of data frames; policing the set of data frames based on the determined respective schema using a set of predetermined rules; forwarding the set of data frames to a queue on the network switch core based on the determined respective schema; and transmitting, by the network switch core, the set of data frames to an end node of the second set of networking end nodes having a corresponding schema.

The method of any preceding clause, further comprising shaping the set of data frames for a transmission based on the queue using one of a synchronous shaper, an asynchronous shaper, and a priority shaper.

The method of any preceding clause, wherein the time aware shaper (TAS) is configured to shape a set of data frames based on a predetermined schedule.

The method of any preceding clause, wherein the first schema is an A664 schema, and the second schema is a TSN schema.

The method of any preceding clause, wherein the network switch core is configured to determine the respective schema of the received set of data frames based on data within the set of data frames.

What is claimed is:

1. A converged avionics data network comprising:
 a network switch core; and
 a first set of networking end nodes and a second set of networking end nodes, communicatively coupled with the network switch core, the first set of networking end nodes including a first subset of networking end nodes configured for a first schema and second subset of networking end nodes configured for a second schema, wherein the second schema is a time-sensitive network (TSN) schema, and the first subset of networking end nodes are otherwise incompatible with the TSN schema;
 wherein the network switch core is configured to:
  receive, from the first set of networking end nodes, a set of data frames;
  determine the respective schema of the set of data frames;
  police the set of data frames based on the determined respective schema in accordance with at least one of IEEE Std. 802.1Qbv and ARINC Specification 664 part 7;
  forward the set of data frames to a predetermined queue on an egress port of the network switch core based on the determined respective schema; and
  shape a transmission of the set of data frames based on the predetermined queue using a time aware shaper (TAS) having a predefined cycle time; and
  transmit the set of data frames to an end node of the second set of networking end nodes having a corresponding schema.

2. The avionics data network of claim 1, wherein the network switch core is provided with a schedule for the transmission of the set of data frames based on an unallocated time slot determined prior to receiving the set of data frames.

3. The avionics data network of claim 2, wherein the schedule comprises a first schedule to transmit the set of data frames in accordance with the first schema, and a second schedule to transmit of the set of data frames in accordance with the second schema.

4. The avionics data network of claim 1, wherein the TAS is configured to schedule the transmission of the set of data frames to a networking end node of the second set of networking end nodes to occur within the same cycle in which the set of data frames was transmitted by a networking end node of the first subset of networking end nodes.

5. The avionics data network of claim 1, wherein the network switch core is configured to shape the transmission of the set of data frames using an asynchronous shaper.

6. The avionics data network of claim 1, wherein the first schema is an A664 schema.

7. The avionics data network of claim 1, wherein the network switch core is configured to shape the set of data frames for transmission to meet an effective band allocation gap requirement of at least one networking end node of the first set of networking end nodes.

8. The avionics data network of claim 6, wherein the first subset of networking end nodes is configured to employ an effective bandwidth allocation gap that is one of an integer multiple of the cycle time of the TAS and an integer divisor of the cycle time of the TAS.

9. The avionics data network of claim 1, wherein the first subset of the networking end nodes is configured to transmit data frames to be received by the networking switch core based on one of a synchronous shaper or asynchronous shaper.

10. The avionics data network of claim 9, wherein the first subset of the networking end nodes is configured to shape the set of data frames using a time aware shaper (TAS) based on predetermined schedule.

11. The avionics data network of claim 10, wherein first subset of networking end nodes further is configured to receive a time synchronization value.

12. The avionics data network of claim 1, wherein at least one networking end node of first subset of networking end nodes is configured for both the first schema and second schema.

13. A method of operating a network architecture, comprising:
 receiving, at a set of data ingress ports for a network switch core for a time-sensitive network (TSN) schema, a set of data frames from a first set of networking end nodes having a first subset of networking end nodes compliant with a first schema and a second subset of networking end nodes compliant with a second schema, for transmission to a second set of networking end nodes, wherein the second schema is a TSN schema, and the first subset of networking end nodes are otherwise incompatible with the TSN schema;
 determining, with the network switch core, the respective schema of the set of data frames;
 policing the set of data frames based on the determined respective schema in accordance with at least one of IEEE Std. 802.1Qbv and ARINC Specification 664 part 7;
 forwarding the set of data frames to a predetermined queue on the network switch core based on the determined respective schema;

shaping the transmission of the set of data frames based on the predetermined queue using a time aware shaper (TAS) having a predefined cycle time; and transmitting, by the network switch core, the set of data frames to an end node of the second set of networking end nodes having a corresponding schema.

14. The method of claim 13, wherein the TAS is one of a synchronous shaper, an asynchronous shaper, and a priority shaper.

15. The method of claim 13, wherein the first schema is an A664 schema.

16. The method of claim 13, wherein the network switch core is configured to determine the respective schema of the received set of data frames based on data within the set of data frames.

17. The avionics data network of claim 1, wherein:

the network switch core includes:
- a first policing module configured to police the set of data frames in accordance with ARINC Specification 664 Part 7; and
- a second poling module configured to police the set of data frames in accordance with IEEE Std. 802.1Qbv.

18. The avionics data network of claim 1, wherein:

the network switch core includes:
- a hybrid TSN/A664 policing module configured to police the set of data frames in accordance with at least one of IEEE Std. 802.1Qbv and ARINC Specification 664 Part 7.

\* \* \* \* \*